United States Patent [19]
Chyung et al.

[11] 3,725,091
[45] Apr. 3, 1973

[54] GLASS-CERAMIC METAL CERMETS AND METHOD

[75] Inventors: Chi-Kwun Chyung, Elmira; Hermann L. Rittler, Horsehead, both of N.Y.

[73] Assignee: Corning Glass Works, Corning, N.Y.

[22] Filed: Apr. 12, 1971

[21] Appl. No.: 133,289

[52] U.S. Cl. ............106/39 DV, 29/182.3, 29/182.5, 75/201, 75/206, 75/208 R, 106/39.7, 106/39.8
[51] Int. Cl. .............................................B22f 1/00
[58] Field of Search............75/200, 201, 206, 208 R; 29/182.5, 182.2, 182.3; 106/39 R, 39 DV, 47

[56] References Cited

UNITED STATES PATENTS

| 3,047,383 | 7/1932 | Slayter | 75/201 |
|---|---|---|---|
| 3,523,357 | 8/1970 | Meyer | 75/206 |
| 3,320,037 | 5/1967 | Scruggs | 75/206 |
| 3,320,036 | 5/1967 | Scruggs | 75/206 |
| 3,175,279 | 3/1965 | Scruggs | 75/206 |
| 2,920,971 | 1/1960 | Stookey | 106/39 |

*Primary Examiner*—Carl D. Quarforth
*Assistant Examiner*—B. Hunt
*Attorney*—Clarence R. Patty, Jr., Clinton S. Janes, Jr. and Kees Van Der Sterre

[57] ABSTRACT

A glass-ceramic metal cermet comprising a glass-ceramic phase consisting essentially of crystals of β-quartz, cordierite, mullite, or calcium aluminate uniformly distributed throughout a glassy matrix and a metal phase consisting essentially of a metal selected from the group consisting of W, Mo, W-Mo alloys and W-Mo-Cr alloys.

12 Claims, 2 Drawing Figures

INVENTORS.
Chi-Kwun Chyung
Hermann L. Rittler
BY

ATTORNEY

GLASS-CERAMIC METAL CERMETS AND METHOD

BACKGROUND OF THE INVENTION

Composite materials of metals and ceramics have been of considerable interest in recent years, with such materials being considered for applications where particular properties of both metals and ceramics are required. Thus these materials can combine the refractoriness of ceramics with the ductility, thermal and electrical conductivity, and toughness of metals, and may be useful in the fabrication of refractory electrodes, high temperature lamps and the like. One of the most important requirements in achieving a successful composite is a basic thermochemical compatibility between the metals and ceramics employed. The nature of the chemical reactions occurring between the ceramic and metal constituents at high temperatures will determine the melting and bonding characteristics of the system. The relative surface energies of the various constituent interfaces, which are often greatly affected by the nature of the interfacial chemical reactions, will determine the phase distribution in the ultimate cermet material. This relative phase distribution will in turn determine the physical and mechanical properties of the cermet.

Glass-ceramics are a comparatively recent development in the glass art, the first commercially practical articles and method being disclosed in U.S. Pat. No. 2,920,971, granted to Stanley D. Stookey. Such articles are normally described as semicrystalline, consisting essentially of fine-grained inorganic crystals uniformly dispersed throughout a glassy matrix and comprising the major proportion of the articles. In brief, the manufacture of a glass-ceramic article comprises the steps of melting a batch for a glass into which has been incorporated, if necessary, a minor amount of a nucleating or crystallization promoting agent, thereafter cooling the melt while simultaneously shaping it into an article of the desired configuration by conventional glass-forming methods, and finally subjecting the article to a specific heat treatment to develop the desired internal crystallization. The initial stage of the heat-treatment has the effect of causing the development of countless submicroscopic particles throughout the body of the glass which serve as nuclei for crystal growth as the heat treatment proceeds, the type of crystals being formed depending upon the composition of the glass from which they are formed. A detailed discussion of this crystallization mechanism and an explanation of the theoretical and practical considerations involved in the production of glass-ceramics is to be found in the aforementioned patent, and reference thereto may be made for further explanation of these matters.

It will be appreciated that glass-ceramics might be employed with particular advantage in the manufacture of cermets because of their unique capability of being transformed from the amorphous to the semicrystalline state by the use of a suitable heat treatment. Thus, a cermet might be initially formed from a finely-divided glass and a finely-divided metal by pressing and sintering at comparatively low temperatures, taking advantage of the low melting temperature of the glass to provide liquid-phase sintering and thus a product of high density and low porosity. Thereafter, the cermet would be subjected to a heat treatment to cause the transformation of the glassy phase thereof into a semicrystalline phase of significantly improved strength, refractoriness and chemical and dimensional stability.

It is accordingly the principal object of the present invention to provide a compatible glass-ceramic metal system which can be used advantageously in the manufacture of a cermet material of improved characteristics.

It is a further object of the present invention to provide an improved cermet material of high density, low porosity, good thermal conductivity, low electrical resistivity and good strength which is compatible with both metals and ceramics in terms of thermal expansion and bonding capability.

Further objects and advantages of the present invention will become apparent to those skilled in the art from the following detailed description thereof, and from the appended drawing wherein FIGS. 1 and 2 are electron photomicrographs of cermets produced according to the present invention.

SUMMARY OF THE INVENTION

Briefly, our invention comprises a family of cermet materials characterized by a metallic phase consisting essentially of molybdenum, tungsten, or Mo-W alloys, usually also containing chromium, which preferably forms a three-dimensionally continuous network throughout a supporting glass-ceramic phase, providing the cermet with high electrical and thermal conductivity even at unusually low metal concentrations. The metallic phase may consist, in weight percent, of 0–100% Mo, 0–100% W, and 0–50% Cr; however, it has been found that continuity in the metallic phase is strongly affected by variations in phase composition, so that where continuity is required, alloys within a preferred range of compositions must be employed.

The glass-ceramic phase may be chosen to provide the particular ceramic properties desired in the cermet product. Such a phase offers the aforementioned advantage that it initially sinters as a glass, and is subsequently converted to a glass-ceramic consisting essentially of inorganic crystals evenly dispersed throughout a glassy matrix and comprising the major proportion (at least 50 percent and usually about 90 percent by volume) of the phase. For high-temperature applications, glass-ceramics wherein mullite and/or calcium aluminate comprise the principal crystalline phases may be employed, while for applications where low thermal expansion in the cermet is desired a crystal phase consisting essentially of $\beta$-quartz or cordierite solid solution might be preferred. These crystal phases are obtained by controlling the composition of the glass used in forming the cermet material so that the desired phase will be formed preferentially upon heat treatment of the sintered body. Thus, $\beta$-quartz solution, cordierite solid solution and mullite may be obtained as principal phases through the use of alkali or alkaline earth aluminosilicate glasses as starting materials, and calcium aluminate through the use of silica-free glasses consisting essentially of CaO and $Al_2O_3$, provided that appropriate crystallization promoting agents are incorporated into the glass if needed. In all cases, however, it must be remembered that the glass-ceramic chosen for use in the cermet must be chemically compatible with the alloy chosen for the metallic phase, i.e., the glass must not contain excessive amounts of readily reducible constituents such as PbO, $As_2O_5$, $Bi_2O_3$ etc., which will interact chemically with the metal so as to effect the wetting and bonding characteristics of the system, and thus the physical and mechanical properties of the cermet. Furthermore, the glass-ceramics should have coefficients of thermal expansion ranging between about $30-90 \times 10^{-7}/°C$. so as to be physically compatible with the metallic phase of the cermet over a broad range of temperatures.

The preparation of cermets according to the method of the present invention normally involves the steps of combining a finely-divided glass of appropriate composition with finely-divided metal powders to form a homogeneous mixture, forming the mixture into a compact of the desired configuration for the cermet, sintering the compact at temperatures above the liquidus temperature of the glass-ceramic, rapidly cooling the sintered compact to avoid uncontrolled devitrification of the amorphous phase, and finally heat treating the compact to cause crystallization in situ of the glassy phase and hence a glass-ceramic metal cermet. The devitrification step may be omitted in some cases where only a glass-metal cermet is desired.

The drawing contains two electron photomicrographs of cermets produced according to the invention. FIG. 1, a photomicrograph taken at 430 × magnification, illustrates a preferred embodiment wherein the metallic phase of the cermet forms a three-dimensionally continuous network throughout the body of the material, providing desirable thermal and electrical properties, while FIG. 2, a photomicrograph taken at 315 × magnification, is a second embodiment of the invention wherein the metallic phase is in the form of discrete metallic particles.

DESCRIPTION OF THE PREFERRED EMBODIMENTS

Figure 1:
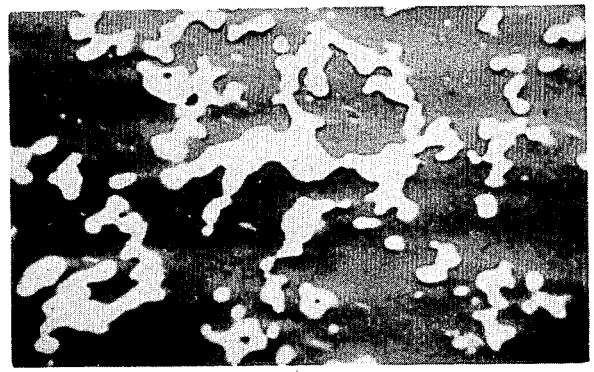

The most desirable combination of properties in the cermets of the invention is obtained when the metallic phase consists of a W-Mo-Cr alloy which forms a three-dimensionally continuous network throughout the body of the material. Such a network imparts good electrical and thermal conductivity to the cermet material and also improves its strength. The achievement of continuity in the metallic phase requires control over alloy composition, glass composition and sintering. Other metallic phase configurations may be obtained by variations in the foregoing, such as metallic dendrites or uniformly distributed but discrete metal particles, but these are commonly obtained in certain prior art cermets and do not offer the advantages of the continuous metal phase structure.

The most important single factor governing metallic phase configuration is metallic phase composition. We have found that both pure Mo or W and Mo-W alloys are thermochemically stable with respect to the glass-ceramics of the present invention, so that cermets wherein the metallic phase consists essentially of pure W and/or pure Mo can be produced. However, it is difficult to produce dense cermets having a continuous metal phase if pure metals are used, particularly where those metals constitute less than about 45 percent by volume of the material. We have found that the presence of chromium in the metallic phase markedly increases the continuity of that phase in any particular glass using a given sintering treatment, so that metallic phase continuity may be obtained even in cermets containing not more than about 20 percent metal by volume, provided that the proper amount of chromium is incorporated into the phase. For this purpose chromium additions of between about 10-40 percent by weight of the alloy are preferred. It is believed that the facility of chromium to increase metal continuity in the cermets of the invention may be attributed to the ease with which chromium migrates through certain glasses. This migration may cause the formation of bridges between discrete metallic particles of Mo or W, which are retained throughout the sintering process due to the basic compatibility of the alloy-glass system. The high mobility of Cr also improves the sinterability of the unit, thus providing a highly-dense sintered compact. Also, the presence of chromium appears to improve the wettability of the metal, which must be of the proper magnitude if the desired continuous phase distribution is to be achieved, and which is important in obtaining good ceramic phase-metal phase bonding in the composite article. And finally, the presence of chromium improves the oxidation resistance of the cermet by protecting the Mo metal therein from oxidation through the formation of a thin, adherent $Cr_2O_3$ film. Alloys which are especially preferred in the manufacture of cermets according to the present invention are those consisting essentially, in weight percent, of about 70–90% Mo and 10–30% Cr. We have also found that titanium metal additions up to about 4 percent by weight may be useful in enhancing the strength of the alloy phase and improving the ability of that phase to bond to oxides, but such additions are by no means essential in attaining continuity in the metal phase.

The alloy phase of the cermets the present invention may constitute between about 20–60 percent by volume of the material. Cermets containing less than about 20 percent metal by volume have lower sintering temperatures, so that liquid phase sintering cannot be carried out without excessive slumping of the compact. Low-temperature solid state sintering may be employed with composites containing only minor amounts of metal, but the process is quite lengthy and the resultant product is undesirably porous. Increased quantities of metal, particularly pure Mo and W, increase the viscosity of the compact at sintering temperatures, so that when the metal content exceeds about 60 percent by volume the attainment of a dense cermet using reasonable sintering temperatures becomes impossible and the probability of metal dendrites in the cermet increases due to the increased solubility of the metal phase in the glass. Accordingly, a metal content between about 25–50 percent by volume is to be preferred.

The glasses to be used in making the cermets of the present invention must be compatible with W, Mo, Cr and their alloys, and also convertible into a semicrystalline material containing the desired crystal phases upon suitable heat treatment thereof. For the purposes of the present invention, compatibility required that the glass-ceramic have a thermal expansion coefficient comparable with that of Mo, W and their alloys (about $35-50 \times 10^{-7}/°C.$), that it contain only minor amounts of glass constituents which react excessively with the metal alloys employed, and that it demonstrate the ability to wet the chosen alloy in appropriate degree. Excessively reactive constituents in the glass will affect the wetting and bonding characteristics of the system. Excessive wetting of the metallic particles by the glass causes the liquid glass to cover the particles completely, preventing the formation of a continuous metallic phase, while insufficient wetting of the metallic particles by the glass causes the glass to excessively "sweat out" of the compact during sintering.

We have found that glasses which are compatible with the alloys of the present invention may contain basic constituents such as CaO, SrO, MgO, BaO, ZnO, $Li_2O$, $Al_2O_3$, and $SiO_2$, and nucleating agents such as Si, $TiO_2$ and $ZrO_2$. However, it is important that the glass contain only minor amounts of $As_2O_3$, PbO, $Bi_2O_3$ and other readily reducible oxides which might react with the alloy phase to alter the wetting and bonding characteristics of the system. Preferably, the glasses will be free of such readily reducible oxides. It is also a requirement that the glass-ceramics resulting from the in situ crystallization of these chemically-compatible glasses have coefficients of thermal expansion ranging between about $30-90 \times 10^{-7}/°C$., so that they will be physically compatible with the alloy phase over a broad range of temperatures. Thus the glasses should contain only minor amounts of constituents such as $Na_2O$ and $K_2O$ which lead to the formation of excessive amounts of high-expansion glassy phases in the cermet. We have found that glasses within the described composition system are not only compatible with the metals used in the cermets of the present invention, but can also be formulated to yield glass-ceramics containing randomly-oriented inorganic crystals evenly dispersed throughout a glassy matrix and consisting essentially of crystalline species selected from the group consisting of $\beta$-quartz solid solution, cordierite solid solution, mullite, and calcium aluminate, provided appropriate thermal treatments are employed therewith.

Where it is desired that the cermet contain increased amounts of $\beta$-quartz solid-solution as the principal glass-ceramic crystal phase, to demonstrate a low thermal expansion coefficient suitable for usage with refractory metals and low expansion ceramics, such a phase may be produced by the in situ crystallization of glasses in the $Li_2O-MgO-Al_2O_3-SiO_2$ composition system nucleated with $ZrO_2$ and/or $TiO_2$. Such glasses may also contain minor amounts of additional nucleating agents such as $SnO_2$ and $Ia_2O_5$, not exceeding a total of about 3 percent by weight, and up to a total of about 5 percent by weight of other bivalent metal oxides such as SrO, BaO, CaO, and ZnO. Especially preferred are glasses consisting essentially, in weight percent on the oxide basis as calculated from the batch, of about 60–70% $SiO_2$, 17–25% $Al_2O_3$, 9–15% MgO, 1–3% $Li_2O$, 0–8% $ZrO_2$, 0–6% $TiO_2$ and 2–10% $ZrO_2+TiO_2$.

When a principal glass-ceramic crystalline phase consisting essentially of cordierite solid solution is desired in the cermet, such a phase may be produced by the in situ crystallization of an essentially alkali-free glass in the $MgO-Al_2O_3-SiO_2$ composition system nucleated by $ZrO_2$, $TiO_2$ or silicon metal. Amounts totaling up to about 3 percent of other bivalent metal oxides such as SrO, BaO, CaO, and ZnO may be tolerated, but are not preferred. Glasses consisting essentially, in weight percent on the oxide basis as calculated from the batch, of about 45–55 percent $SiO_2$, 27–37 percent $Al_2O_3$, 11–16 percent MgO and a nucleating agent selected in the indicated proportion from the group consisting of 0.5–2% Si and 2–12% $TiO_2$, wherein $ZrO_2$ may be substituted for $TiO_2$ in amounts ranging up to about 5% on a weight-for-weight basis, are particularly preferred.

When a principal glass-ceramic phase consisting essentially of mullite is desired in the cermet, such a phase may be produced by the in situ crystallization of aluminosilicate glasses in which no nucleating or crystallization promoting agents have been included. Such glasses are self-nucleating, yielding mullite as the principal crystalline phase upon suitable heat treatment. If desired, the glass may contain a total of up to about 20% of bivalent metal oxides selected from the group consisting of SrO, CaO, MgO, BaO and ZnO as glass stabilizing agents. Especially preferred are glasses consisting essentially, in weight percent on the oxide basis as calculated from the batch, of about 45–55% $SiO_2$, 35–45% $Al_2O_3$, and 5–15% BaO.

Finally, when the increased presence of calcium aluminate is required in the glass-ceramic phase, such crystallization may be produced by heat treating glasses in the $CaO-Al_2O_3$ composition system, containing at least about 3 percent $ZrO_2$ as a nucleating agent, which are essentially silica-free. Such glasses may additionally contain a total of up to about 20 percent of bivalent metal oxides selected from the group consisting of MgO, BaO, ZnO and SrO, which act as both solid solution crystalline network formers and/or modifiers. Especially preferred are glasses consisting essentially of 32–45% CaO, 35–50% $Al_2O_3$, 5–10% MgO, 5–10% BaO, and 6–15% $ZrO_2$. Cermets containing a silica-free calcium aluminate glass-ceramic phase offer several advantages over silica-containing cermets. The calcium aluminate phase is very refractory and chemically stable at high temperatures under adverse conditions. Therefore, cermets containing this phase are eminently suitable for such high-temperature applications as sealing metal vapor lamps where the present of $SiO_2$ is to be avoided. In addition, cermets containing these glasses sinter to significantly higher densities than do $SiO_2$-containing cermets, and form very thin and uniform glassy surface layers during sintering. This behavior is attributed to the lower viscosity of these silica-free glasses at sintering temperatures.

The use of glasses within the preferred composition areas described is effective in maximizing the growth of the desired crystal phases while minimizing the presence of other less desirable phases which may adversely affect the properties of the cermet, and additionally helps to assure continuity in the metallic phase due to the basic thermochemical compatibility of the preferred glasses therewith.

The useful properties of cermets produced according to the invention are partly attributable to the fact that they may be liquid-phase sintered. This assures good metal-ceramic bonding and the desired phase distribution. However, the manner in which the sintering operation is carried out can also affect the properties of the resultant cermet. We have found that the highest density in cermets having a continuous metallic phase is achieved by sintering at temperatures ranging from about 100°–200°C. above the liquidus temperature of the glass-ceramic phase to be produced, with the optimum temperature in the range being determined by the metallic content of the compact. As previously mentioned, increasing the metal content greatly increases the viscosity of the compacts, necessitating higher sintering temperatures to achieve the same theoretical density. If sintering temperatures which are excessively close to the liquidus of the projected glass-ceramics are employed, tremendous grain growth in the glass is observed, resulting in weak and brittle cermets due to the inhomogeneity of the glass-ceramic phase. If, on the other hand, excessively high temperatures are employed in sintering, the deformation of the compact will be high, excessive coalescent of the metal particles will occur, and increased quantities of the metallic phase will dissolve in the glass. The result of metal dissolution in the glass is the formation of metal dendrites upon cooling. Thus, we have found that temperatures ranging between about 1300°–1550°C. are suitable for sintering the cermets of the present invention, with temperatures ranging between about 1350°–1450°C. being preferred for cermets containing Mo-W-Cr alloys in amounts ranging between about 25–50 percent by volume. It is important to remember that, after sintering, the compact should be cooled rather rapidly from the sintering temperature to at least the nucleation temperature of the glass-ceramic phase, or below. Prolonged holding at excessive temperatures prior to nucleation will result in haphazard crystallization of the amorphous phase and, hence, a less desirable product.

Table I contains several examples of cermets produced according to the present invention, including the composition of the glass-ceramic phase, the thermal expansion of that phase, the identity of the crystalline species present therein, the composition of the metal phase, a description of the metal phase distribution throughout the material, the volume fraction of metal present in the cermet, and the heat treatment used in sintering the cermets and converting the amorphous phase into a glass-ceramic phase. Also listed are various properties of the products where determined on individual samples, including room temperature electrical resistivity, temperature coefficient of electrical resistivity, thermal conductivity, modulus of rupture, elastic modulus, average coefficient of thermal expansion over a specified range and density. Glass compositions are listed in weight percent on the oxide basis as calculated from the batch, and alloy compositions in weight percent.

Figure 2:
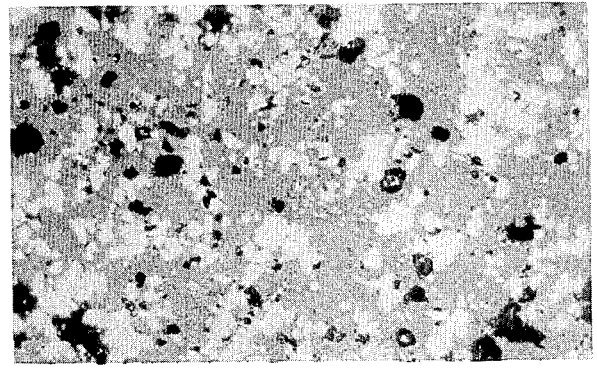

The crystal phase data contained in Table I were obtained by X-ray diffraction analysis. The first species listed in each example is the principal glass-ceramic crystal phase present, all subsequent species were present only in minor amounts. Transmission electron and scanning electron microscopes were used to determine the metal-glass-ceramic phase structures. From a review of that data it can be seen that all of the cermets within the preferred ranges of composition demonstrate the continuous metallic network at low metallic volume characteristic of the cermets of the present invention. This continuity is illustrated in FIG. 1 of the drawing, which is a photomicrograph of a cermet of the composition of Example 3 of Table I, taken at 430 × X magnification, wherein the metal alloy phase consists essentially of 30% Mo and 20% Cr and 1% Ti and comprises about 25% by volume of the material. FIG. 2, on the other hand, shows the particulate metallic-phase distribution of a cermet of composition 8 of Table I, taken at 315 × magnification, wherein the metallic phase consists essentially of 40% Mo and 4% Ti and comprises about 20% by volume of the material.

We have found that the density of the cermet may be increased and the continuity of the metallic phase improved by using very finely-divided starting materials, preferably finer than about 200 mesh, and by intimately mixing the constituents together to assure homogeneity in the compact. Thus, the cermets shown in Table I were produced from glass powders which had been ball milled to about 200–400 mesh and powdered W, Mo, Cr and Ti finer than about 250 mesh. The glass and metal powders were tumble mixed for at least about 24 hours and then cold-pressed to form articles of the desired configuration. Sintering was carried out in a vacuum furnace, although atmosphere sintering, preferably under non-oxidizing conditions, for example, with hydrogen or argon, would also be suitable.

Subsequent to the sintering step, the cermets should be heat-treated at temperatures between about 700°–1300°C. to transform the amorphous phase into the desired glass-ceramic phase. Such treatments generally require about 1–8 hours, with the use of lower temperatures requiring somewhat longer treatments and vice versa. Preferably, the heat-treatment will comprise two steps: a nucleation step wherein the cermet is heated to a temperature between about 700°–800°C. for a time sufficient to develop crystal nuclei evenly throughout the glassy phase, this time usually ranging from about 1–4 hours, and a crystallization step wherein the cermet is heated to a temperature between about 900°–1300°C. for a time sufficient to achieve the desired degree of crystallization, this time usually ranging from about 1–4 hours. Although such two-step treatments are by no means required, they will lead to the production of cermets wherein the glass-ceramic phase is very fine grained and evenly crystallized, and thus they are preferred. Heating rates used in crystallizing the cermets of the invention may range between about 50°– 500°C. per hour, depending upon the mass and configuration of the article, with the preferred heating rate being about 300°C. per hour.

One of the principal advantages of cermets produced according to the present invention is an excellent capability of bonding to oxides resulting from the presence of a uniform glass-ceramic skin ranging in thickness from about 2–20 mils on the surface of the material. This glass-ceramic skin is stable at high temperatures and resistant to oxidation. Its presence results from the formation of a glassy skin on the cermet during liquid-phase sintering which is subsequently converted to a glass-ceramic upon appropriate heat treatment. A further advantage of these cermets is a low temperature coefficient of resistivity which is attributed to the integral combination of the ceramic and metallic phases in the cermet resulting from the basic thermochemical compatibility of the system. Finally, the cermets of the present invention provide excellent bonding to metals, particularly during the sintering step, due to the presence of a mobile and continuous metal alloy phase.

We claim:

1. A glass-ceramic metal cermet comprising a metallic phase making up about 20–60 percent by volume of said cermet consisting essentially of a metal selected from the group consisting of W, Mo, W-Mo alloys and W-Mo-Cr alloys, and a glass-ceramic phase making up the remainder of the volume of said cermet consisting essentially of crystals of a species selected from the group consisting of beta-quartz solid solution, cordierite solid solution, mullite and calcium aluminate evenly dispersed throughout the glassy matrix of said glass-ceramic phase and comprising a major proportion thereof.

2. A cermet according to claim 1 wherein the glass-ceramic phase has a coefficient of thermal expansion ranging between about $30$–$90 \times 10^{-7}/°C$.

3. A cermet according to claim 2 wherein the metallic phase consists essentially in weight percent, of about 0–100% Mo, 0–100% W and 0–50% Cr.

4. A cermet according to claim 3 wherein the metallic phase consists essentially of 70–90% Mo and 10–30% Cr, forms a three-dimensionally continuous network throughout the cer-met and comprises about 25–50% by volume thereof.

5. A cermet according to claim 3 wherein the glass-ceramic phase consists essentially of crystals of $\beta$-quartz solid solution evenly dispersed throughout a glassy matrix and comprising a major proportion of the phase, said phase being produced by the in situ crystallization of a glass consisting essentially, in weight percent on the oxide basis as calculated from the batch, of about 60–70% $SiO_2$, 17–25% $Al_2O_3$, 9–15% MgO, 1–3% $Li_2O$, 0–8% $ZrO_2$, 0–6% $TiO_2$ and 2–10% $TiO_2+ZrO_2$.

6. A cermet according to claim 3 wherein the glass-ceramic phase consists essentially of crystals of cordierite solid solution evenly dispersed throughout a glassy matrix and comprising a major proportion of the phase, said phase being produced by the in situ crystallization of a glass consisting essentially, in weight percent on the oxide basis as calculated from the batch, of about 45–55% $SiO_2$, 27–37% $Al_2O_3$, 11–16% MgO and a nucleating agent selected in the indicated proportion from the group consisting of 0.5–2% Si and 2–12% $TiO_2$, wherein $ZrO_2$ may be substituted for $TiO_2$ in amounts ranging up to about 5 percent on a weight-for-weight basis.

7. A cermet according to claim 3 wherein the glass-ceramic phase consists essentially of mullite crystals evenly dispersed throughout a glassy matrix and comprising a major proportion of the phase, said phase being produced by the in situ crystallization of a glass consisting essentially, in weight percent on the oxide basis as calculated from the batch, of about 45–55% $SiO_2$, 35–45% $Al_2O_3$, and 5–15% BaO.

8. A cermet according to claim 3 wherein the glass-ceramic phase consists essentially of calcium aluminate crystals evenly dispersed throughout a glassy matrix and comprising a major proportion of the phase, said phase being produced by the in situ crystallization of a glass consisting essentially, in weight percent on the oxide basis as calculated from the batch, of about 32–45% CaO, 35–50% $Al_2O_3$, 5–10% MgO, 5–10% BaO and 6–15% $ZrO_2$.

9. A method of making a glass-ceramic metal cermet comprising the steps of:

a. mixing a finely-divided thermally crystallizable glass with finely-divided metals selected from the group consisting of Mo, W and Cr to form a homogeneous mixture, said metals being convertible into a metallic phase comprising about 20–60% by volume of the mixture upon sintering and consisting essentially in weight percent of about 0–100% Mo, 0–100% W and 0–50% Cr, and said glass being thermally crystallizable in situ to yield a glass-ceramic having a coefficient of thermal expansion ranging between about $30-90 \times 10^{-7}/°C$. wherein a crystalline species selected from the group consisting of β-quartz solid solution, cordierite solid solution, mullite and calcium aluminate constitutes the principal crystalline phase;

b. forming said homogeneous mixture into a compact;

c. sintering the compact at temperatures ranging from about 100–200°C. above the liquidus temperature of said principal crystalline phase in said thermally crystallizable glass;

d. rapidly cooling the compact to at least the nucleating temperature of said thermally crystallizable glass, and e. thereafter subjecting the compact to a crystallization heat treatment to cause the development of crystal nuclei evenly throughout the glassy phase and the subsequent development of the desired degree of crystallization therein.

10. The method of claim 9 wherein the crystallization heat treatment comprises heating the cermet to a temperature ranging from about 700°–1300°C. for a time ranging from about 1–8 hours.

11. The method of claim 10 wherein the crystallization heat treatment comprises heating the cermet to a temperature ranging from about 700°–800°C. for a time ranging from about 1–4 hours, and thereafter heating it to a temperature ranging from about 900°–1300°C. for a time ranging from about 1–4 hours.

12. The method of claim 11 wherein the compact is sintered at temperatures ranging from about 1300°–1550°C.

* * * * *